United States Patent [11] 3,543,704

| [72] | Inventors | Harold Valentine Hansen<br>Cordova;<br>Robert Leroy Chidester, East Moline,<br>Illinois |
|---|---|---|
| [21] | Appl. No. | 750,078 |
| [22] | Filed | Aug. 5, 1968 |
| [45] | Patented | Dec. 1, 1970 |
| [73] | Assignee | Deere & Company<br>Moline, Illinois<br>a corporation of Delaware |

[54] SEED PLANTER
12 Claims, 6 Drawing Figs.

[52] U.S. Cl. ............................................. 111/52,
                                                    111/63
[51] Int. Cl. .............................................. A01c 5/08,
                                                    A01c 7/06
[50] Field of Search. ............................... 111/52, 59,
                                 60, 62, 73, 80, 85, 53, 63

[56]                References Cited
                UNITED STATES PATENTS

| 1,902,924 | 3/1933 | Wamhoff et al. | 111/52X |
| 2,237,775 | 4/1941 | Woods et al. | 111/52X |
| 2,416,189 | 2/1947 | McIntyre | 111/62X |
| 2,698,114 | 12/1954 | Buhr | 111/52X |
| 2,855,875 | 10/1958 | Oehler et al. | 111/52 |
| 2,968,266 | 1/1961 | Gustafson | 111/85X |
| 3,161,164 | 12/1964 | Tanke | 111/52(WT) |
| 3,331,341 | 7/1967 | Hartwig | 111/73 |
| 3,335,681 | 8/1967 | Main et al. | 111/73X |
| 3,348,505 | 10/1967 | Smith | 111/73 |
| 3,373,705 | 3/1968 | Hansen et al. | 111/73 |

Primary Examiner—Robert E. Bagwill
Assistant Examiner—Alan E. Kopecki
Attorneys—H. V. Harsha, Harold M. Knoth, William A. Murray and John M. Nolan ABSTRACT: A tractor-drawn agricultural planter having a frame comprised generally of a longitudinal draft member and fore-and-aft transverse members with a cantilevered rear section projecting from the rear member in spaced relation to the ground, the frame being carried by ground wheels disposed between the fore-and-aft frame members and adjustable between transport and working positions. A plurality of commonly driven individual planting units, including seed selecting and dispensing means, are mounted for transverse adjustment on and extend rearwardly beneath the rear section from the rear transverse frame member, these units each containing a small auxiliary seed hopper which is supplied with seed from high capacity central seed hoppers mounted on the planter frame. Fertilizer hoppers and dispensing means are mounted on the forward transverse frame member, and high-capacity central pesticide hoppers and dispensing means are supported on the rear section above the rearward portion of the planting units.

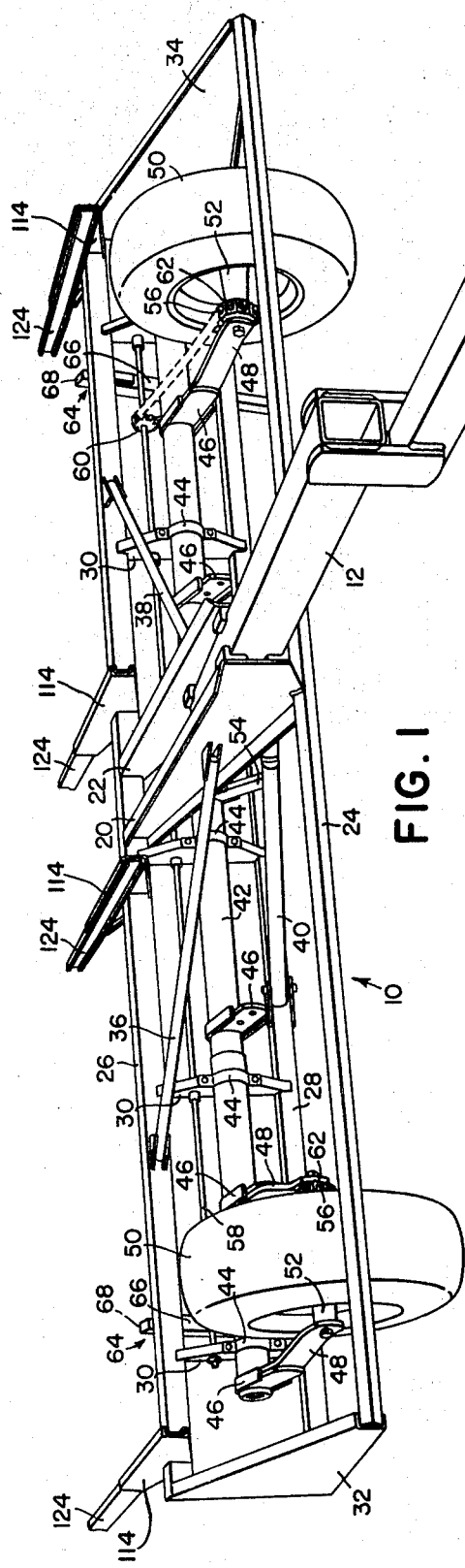
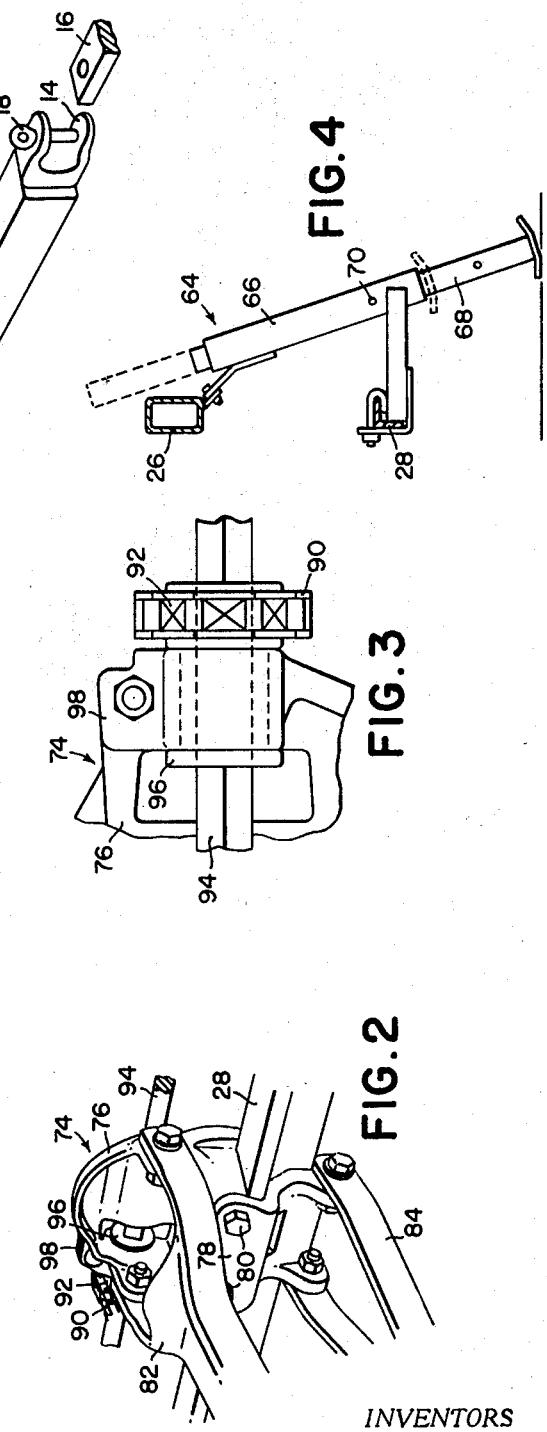

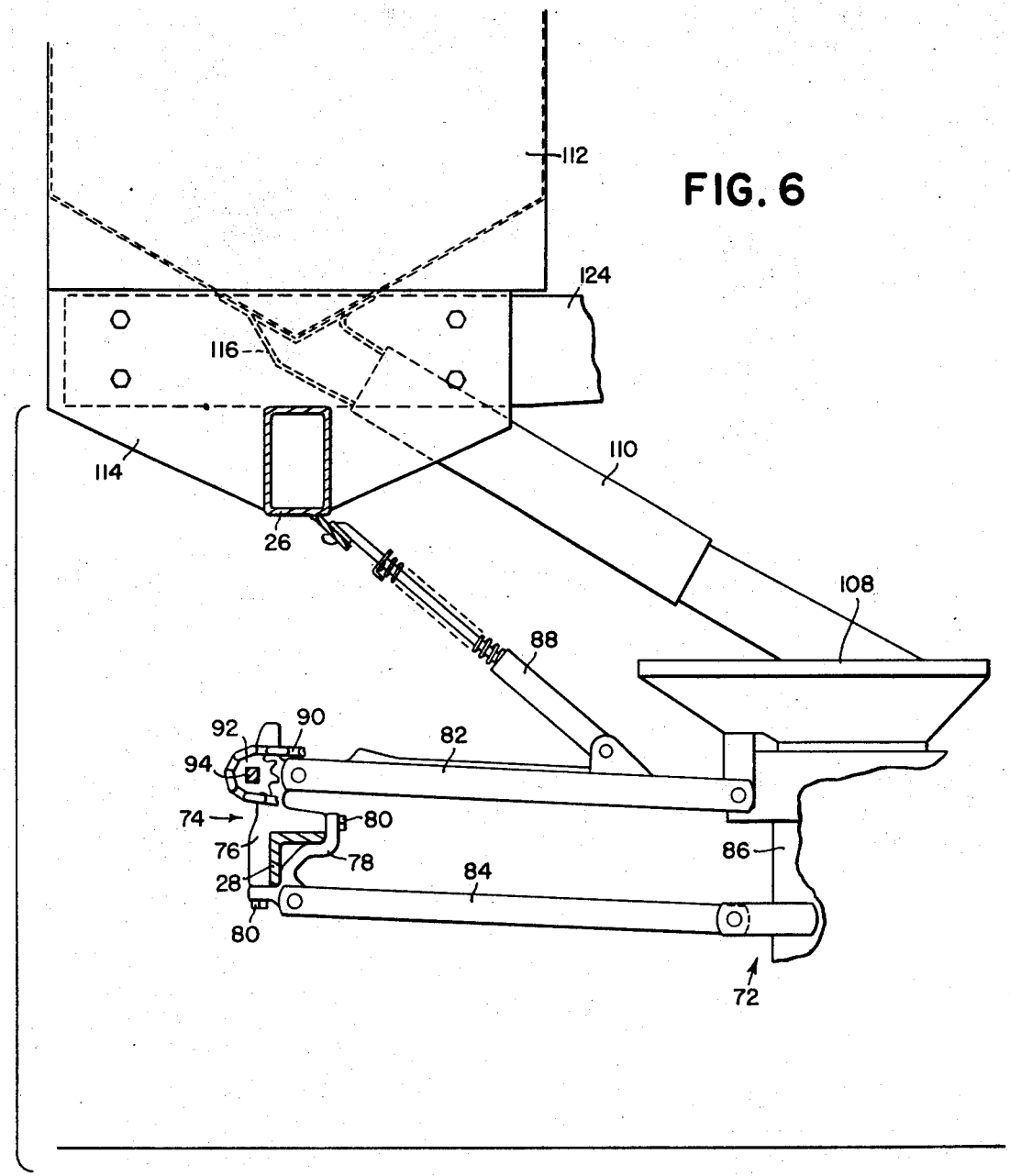

3,543,704

1
SEED PLANTER

BACKGROUND OF THE INVENTION

The present invention relates generally to agricultural equipment, and more particularly to tractor-drawn planters.

In the past the universal practice was to plant corn and other crops in rows spaced approximately 40 inches apart. This particular row spacing, which was best adapted to the horse-drawn cultivators then available, continued in universal use until the late 1950's. At that time experimentation with narrower row spacings, notably 30 and 20 inches, was begun and has continued to the present, the purpose of such experimentation being to determine the row spacing which gives maximum crop yield. The current trend is to plant at these narrower row spacings rather than at 40 inches as was common in the past. At the same time, due to technological advances in planter design, the speed at which corn and other crops can be planted has increased, leading to the desirability of greater capacity hoppers.

Agricultural planters heretofore available, typified by that shown in U.S. Pat. No. 3,055,322 issued Sept. 25, 1962 to Oehler et al., commonly utilize a tranvserse frame to which a plurality of rearwardly extending planting units are connected, the frame being carried by ground wheels disposed rearwardly of the transverse frame, between the planting units. Each planting unit generally contains its own seed hopper atop its seed selecting and dispensing mechanism, and, if it is desired to apply chemicals such as herbicide and insecticide while planting, each planting unit is generally fitted with separate hoppers for these chemicals.

The conventional planter of the Oehler type has two basic features which often make it unacceptable for planting corn in narrow rows. The first of these unacceptable features is that the ground or drive wheels of the planter are disposed between the individual planting units such that they tend to interfere with the units, and particularly the seed hoppers mounted thereon, when the units are spaced, for example, only 20 inches apart. In order to obviate this problem yet retain the conventional planter design it would be necessary to either reduce the width of the ground wheels employed, an undesirable modification, or reduce the size and thus the capacity of the seed hoppers, an equally undesirable result. The second of these unacceptable features referred to above inheres in the fact that each individual planting unit of the conventional planter carries its own seed hopper as well as herbicide and insecticide hoppers on those planters so equipped. As the number of rows desired to be planted with one pass and thus the number of planting units on the conventional planter is increased, the number of such hoppers is also increased. Thus on a conventional planter modified to plant eight 20-inch rows and equipped with herbicide and insecticide dispensers, there are 24 individual hoppers which the operator must continually refill in the course of the planting operation. And since planting speeds are increasing, the operator is required to fill this increased number of hoppers at increasingly frequent intervals. It should also be observed that as the hoppers on each planting unit become emptied during the planting operation the down pressure exerted on the press wheel, and consequently the planting depth, will very accordingly.

Most manufacturers of corn planters today offer units similar to that shown in U.S. Pat. No. 3,331,341 issued July 18, 1967 to Hartwig for planting in 20-inch rows. In this style of planter a toolbar is supported to the rear of two or more ground wheels and a plurality of unit planters are adjustably secured to the toolbar for variable row widths. The Hartwig form of planter retains the second undesirable feature of the Oehler type planter, however, since each of its planter units supports its own hoppers for seed, herbicide and insecticide. The Hartwig design has a further disadvantage in that the distributing mechanism of each planter unit is driven from its associated press wheel rather than from a common drive shaft carried by the planter frame. Thus, if it is desired to change the distribution rates of the planter units, it is necessary to vary the drive from each press wheel to the associated distributing mechanism for each planter unit.

SUMMARY OF THE INVENTION

It is accordingly a principal object of this invention to provide a planter which overcomes the aforementioned disadvantages of the prior art planters yet one which may be modified easily by the operator to plant different numbers of rows at different row spacings.

A further object of this invention is to provide a multirow, tractor-drawn planter which will have minimum service down time during operation of the planter. More particularly it is an object of this invention to provide a multirow, tractor-drawn planter having extremely high-capacity seed, herbicide and insecticide hoppers while at the same time affording relatively unrestricted transverse adjustment of the individual planting units mounted thereon. To this end, the ground wheels of the present invention are disposed forwardly of the individual planting units, and centralized seed, herbicide and insecticide hoppers mounted on the planter frame are provided, each such hopper supplying a plurality of planting units.

An additional object of this invention is to provide a multirow, tractor-drawn planter having a variable number of planting units adjustably mounted for variable row spacings, whose distribution rates may be varied simultaneously.

A still further object of this invention is to provide such a planter in which convenient access may be had to the seed, herbicide and insecticide hoppers mounted thereon. This object is achieved through the provision of a raised platform supported by the planter frame and extending between the various centralized hoppers.

It is an additional object to provide such a planter having fertilizer carrying and distributing means mounted thereon.

BRIEF DESCRIPTION OF THE DRAWINGS.

FIG. 1 is a perspective view of the basic frame and running gear components of the present invention.

FIG. 2 is a detailed perspective view illustrating the method in which the individual planting units are mounted on the planter frame.

FIG. 3 is a partial view of the planting unit drive mechanism.

FIG. 4 is a side view of the planter jackstand.

FIG. 6 is a side view showing the spatial relationship of the planting units and the planter frame.

DESCRIPTION OF THE PREFERRED EMBODIMENT

Figure 5:
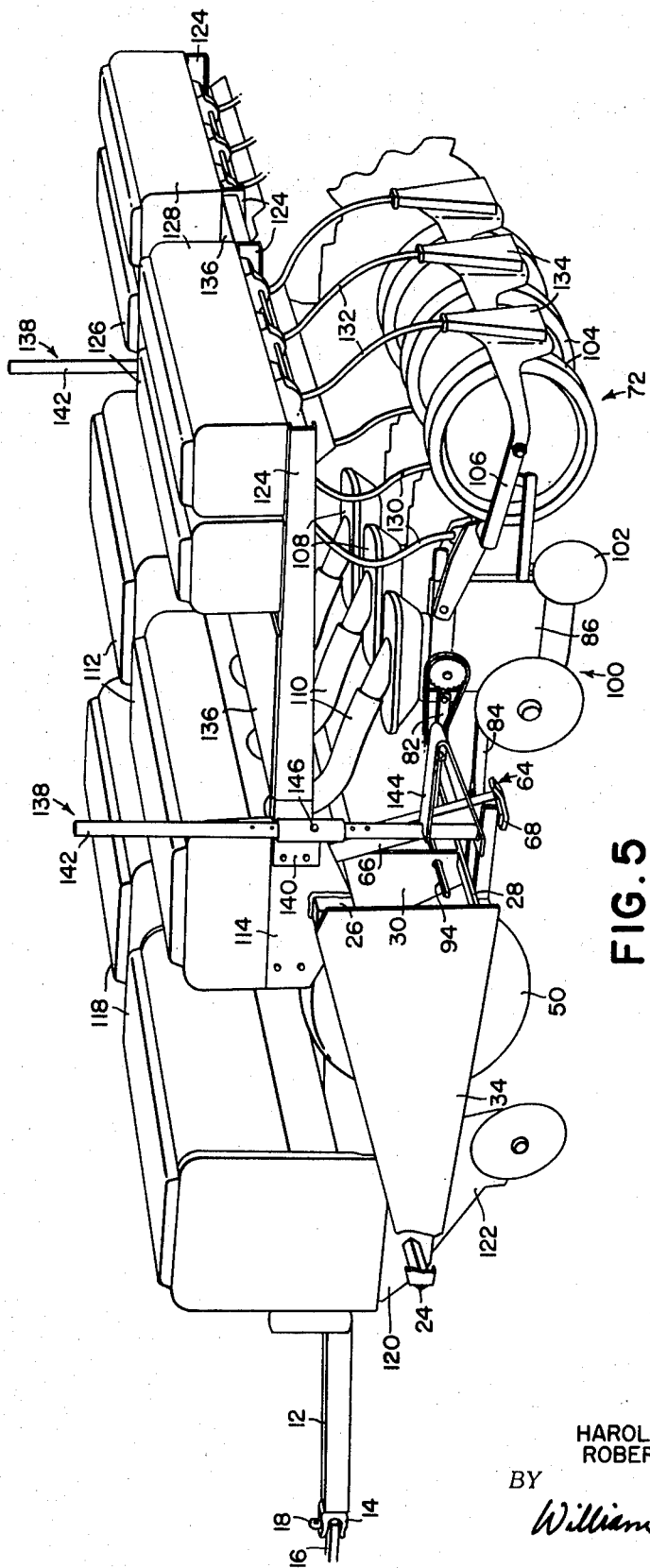
FIG. 5 is a perspective view of the complete planter.

In the following description right- and left-hand reference is determined by standing at the rear of the planter and facing forward.

Referring to FIG. 1, the planter of the present invention has a main frame 10 including a forward longitudinally extending draft member 12 having hitch clevis 14 rigidly attached to its forward end. Hitch clevis 14 is bifurcated for receiving the tractor drawbar 16, the two members being releasably connected by means of hitch pin 18. Right and left, longitudinally extending center plates 20 and 22 respectively, are rigidly secured to the sides of the rear portion of draft member 12 and connect forward transverse frame section or member 24 with a central transverse frame section composed of an upper transverse frame member or portion 26 and a lower transverse frame portion or sill bar 28, the latter being rigidly attached to frame member 26 by means of transversely spaced vertical plates 30. The outer ends of frame members 24, 26 and 28 are connected by right and left triangular end plates 32 and 34 respectively. Right and left upper diagonal brace members 36 and 38 respectively, rigidly connect center plates 20, 22 with upper rear transverse frame member 26, while right and left lower diagonal brace members connect center plates 20, 22 with lower rear transverse frame member 28, only the right lower brace 40 being shown.

A transversely extending rockshaft 42 is journaled to the front side of vertical plates 30 with bearing caps 44. Rockshaft 42 has three short rock arms 46 rigidly attached to and extending forwardly from each of its end portions, the rock arms 46 being transversely spaced at equal intervals. Two pairs of straps 48 may be releasably secured to rock arms 46 by means of conventional fasteners in either an outer position, in which case straps 48 would be secured to the two outermost rock arms 46 (illustrated in FIG. 1), or an inner position, in which case straps 48 would be secured to the two innermost rock arms 46. Right and left ground wheels 50 are disposed in the spacing between the front frame section 24 and central frame section and are received between straps 48 and mounted therein for rotational movement on axles 52. Lift arm 54, rigidly attached to and extending downwardly and forwardly from the center portion of rockshaft 42, is suitably apertured at its outer end for receiving one end of a hydraulic lift cylinder assembly, the other end of the cylinder being swingably mounted between the lower portions of center plates 20 and 22. In operation the lift cylinder is connected with the hydraulic system of the tractor. It is apparent from the above description that when the lift cylinder is retracted the planter is in its lowered, working position, and when the cylinder is extended the planter is in its raised, transport position.

Mounted on the inner ends of axles 52 are sprockets 56 which rotate with the ground wheels 50. A transversely extending jackshaft 58, journaled for rotational movement in vertical plates 30 and having right and left sprockets 60 disposed in longitudinal alinement with sprockets 56 on axles 52, is driven from the ground wheels by means of right and left drive chains 62.

Identical right and left jackstands 64 are supported by the rear transverse frame members 26, 28 rearwardly of the ground wheels 50. As shown best in FIG. 4, each jackstand 64 is comprised generally of a stationary holder 66 mounted for transverse adjustment on the upper and lower rear transverse frame members 26, 28 and a sliding support member 68 received for sliding movement within stationary holder 66. Sliding member 68 is suitably apertured such that it may be releasably secured in either a raised or lowered position by means of removable pin 70, which is received by a single aperture in stationary holder 66. During the planting operation sliding members 68 of jacks 64 are secured in a raised position, illustrated in FIG. 5, and when the planter is unhitched from the tractor, as shown in FIG. 1, sliding members 68 are secured in a lowered position such that they support the planter in conjunction with ground wheels 50. When in this latter position, it is apparent that the longitudinal angle of the planter with the ground, and thus the height of the hitch clevis 14 on the forward end of draft member 12, may be controlled by raising and lowering the ground wheels 50 to facilitate hitching the planter to the tractor.

As shown in FIG. 5, a plurality of substantially identical row planting units, designated generally at 72, are attached to and extend rearwardly from the lower rear transverse frame member or sill bar 28. Each planting unit 72 includes a mounting bracket 74 releasably securable in various transverse positions to the frame member 28. As shown best in FIGS. 2 and 6, mounting bracket 74 includes a main bracket 76 rigidly held to frame member 28 by means of clamp bracket 78 and bolts 80. The transverse position of mounting bracket 74 may thus be adjusted by loosening bolts 80 and sliding the bracket 74 to the desired position on frame member 28. Upper and lower, generally parallel links 82 and 84, respectively, are pivotally attached to and extend rearwardly from mounting bracket 74. The rearward ends of links 82, 84 are pivotally secured to shank 86, such that shank 86 can move vertically with respect to the planter frame while maintaining a constant angle with the ground. Spring link 88, extending between the rearward portion of upper link 82 and the upper transverse frame member 26, controls both the downward force and the maximum extent of downward travel of the planting units.

Contained within shank 86 is a seed selecting means such as the conventional seed plate type or the finger pickup type shown in U.S. Pat. No. 3,308,774 to Keeton, issued Mar. 14, 1967. The seed selecting means of each of the planting units 72 is driven by means of roller chain 90 from sprocket 92 on common drive shaft 94 which extends transversely between the upper and lower rear transverse frame members 26, 28, and is in turn driven by conventional means from the rockshaft 42. As shown in detail in FIGS. 2 and 3, drive shaft 94, of square cross section, is supported for rotational movement at each of the mounting brackets 74. Sprocket 92 is rigidly attached to the outer end of bearing member 96, which is suitably apertured for receiving drive shaft 94. Bearing member 96, which thus rotates with drive shaft 94, is journaled to mounting bracket 74 by means of bearing cap 98.

The seed is ejected from the lower rear portion of shank 86 into a furrow formed by furrow opener means 100 mounted at the base of shank 86. Right and left covering disks 102 cover the seed with soil which is thereafter compressed by means of press wheel 104 carried for rotational movement in press wheel frame 106.

The seed selecting means of each planting unit 72 is supplied with seed from a small auxiliary hopper 108 mounted on top of shank 86. These auxiliary hoppers 108 are in turn supplied through flexible conduits or hoses 110 from right and left central seed hoppers or tanks 112 disposed above the upper rear transverse frame member 26. The tanks 112 have a transverse expanse spanning several planter units 72 and the spacings therebetween. The ends of the hoppers 112 are secured to seed hopper mounting brackets 114 which are, in turn, rigidly mounted on frame member 26. The number of seed discharge areas 116 in each of the hoppers 112 may be varied according to the number of rows to be planted and thus the number of planting units 72 mounted on the planter. For example, when the planter is set up to plant four rows, each hopper 112 must supply two planting units 72 and thus two discharge areas are required in each hopper. If the planter is instead set up to plant six or eight rows, each hopper must supply three or four units, respectively, and a corresponding number of discharge areas is required.

It is important here to note that the discharge areas 116 in the central seed hoppers 112 are located well forward of the auxiliary hoppers 108 on the planting units 72. This relative location, shown best in FIGS. 5 and 6, results in a minimal compression of the flexible hoses 110, and thus the seed contained within the hoses, when the planting units 72 are raised relative to the central seed hoppers.

Right and left transversely elongated fertilizer hoppers or tanks 118, also spanning several row units and the spacings therebetween, are mounted above the forward transverse frame member 24 by means of mounting brackets 120. The fertilizer is fed from the hoppers 118 through flexible hoses (not shown) to fertilizer openers 122 mounted for transverse adjustment on transverse frame member 24. An auger-type distributing means driven from the planter jackshaft is employed. The number of fertilizer discharge areas in the hoppers 118 may be varied depending on the number of rows desired to be planted.

Rigidly attached to each seed hopper mounting bracket 114 and extending rearwardly therefrom is a pesticide hopper support arm 124, as shown in FIG. 5 and 6. The arms 124 may be considered as a rear frame section cantilevered from the upper portion 26 of the central frame section so as to have an open space thereunder extending the transverse expanse of a plurality or rows. The row units 72 may float in accordance with the ground characteristics in this latter open space. Right and left insecticide hoppers 126 and herbicide hoppers 128 are mounted on the rearward ends of support arms 124 above the rearward portion of the planting units 72. The contents of the insecticide hoppers 126 are fed through flexible hoses 130 to a discharge point immediately behind the furrow opener means 100, while the contents of the herbicide hoppers 128 are fed through flexible hoses 132 to conventional diverging dispensers 134 mounted on the rear of press wheel frames 106. A conventional material-distributing means, driven from the jackshaft 58, and metering device, for controlling the rate of flow, is utilized in both the herbicide and insecticide hoppers. The number of discharge areas in each of the pesticide hoppers 126, 128 may be varied depending on the number of rows to be planted, in the same manner as previously explained with regard to both the central seed hoppers 112 and the fertilizer hoppers 118.

A man-supporting platform or catwalk 136, held by support arms 124, is provided in the transversely extending area between the central seed hoppers 112 and the insecticide hoppers 126 and also in the central area between the left and right herbicide and insecticide hoppers. The purpose of this catwalk is to provide convenient access to both the seed and pesticide hoppers so they may be easily filled. To further this end, a step 138 is provided on both sides of the planter immediately outward from the left and right ends of catwalk 136. Step 138 includes a support bracket 140 rigidly secured to the outer seed hopper mounting bracket 114, an upright member 142 fitted for sliding vertical movement within support bracket 140, and a step plate 144 fixed to the lower end portion of upright member 142. A plurality of vertically spaced apertures is contained in upright member 142 such that it may be releasably secured in various vertical positions by means of pin 146 which is received by a single aperture in support bracket 140. The height of step plate 144 may thus be adjusted to suit the needs of the individual operator.

We claim:

1. An implement frame to which a plurality of planting units may be secured in adjustable row widths, said implement frame comprising: upper and lower transversely extending main frame members, said planting units being securable to said lower transverse frame member; a longitudinally extending draft frame means secured to and extending forwardly from said upper and lower transverse frame members; a rockshaft supported by said upper and lower transverse main frame members, said rockshaft being provided with rock arms to which ground-engaging wheel means are secured; means operable to raise and lower said ground-engaging wheel means; seed hopper means mounted on said upper transverse main frame member; a transversely extending jackshaft extending along said lower transverse main frame member, said jackshaft being adapted to drive planter units secured to said lower transverse main frame member; right and left forwardly extending frame members carried by said upper and lower transversely extending main frame members; and forward transverse frame means extending between the forward ends of said right and left forwardly extending frame members and interconnected with said longitudinally extending draft frame means.

2. The implement frame set forth in claim 1 further characterized by the provision of fertilizer hopper means mounted on said forward transversely extending frame means, and fertilizer opener means also carried by the forward transversely extending frame means.

3. The implement frame set forth in claim 1 further characterized by the provision of rearwardly extending frame means supported by said upper and lower transverse frame means, said rearwardly extending frame means supporting in overlying relationship to said planting units pesticide hoppers which may supply material to a plurality of planting units.

4. The implement frame set forth in claim 3 further characterized by the provision of catwalk means between the pesticide hoppers and the seed hoppers.

5. The implement frame set forth in claim 3 further characterized by the provision of a support jack mounted to the rear of the upper and lower transversely extending main frame means, said support jack facilitating hooking the implement to a tractor.

6. A row crop seed planter comprising: a forwardly movable rigid main frame structure having a central transverse horizontal section with upper and lower portions, a forward transverse horizontal section alined with and spaced forwardly of the lower portion of the central section, and a rear section cantilevered rearwardly from the upper portion to define an unobstructed open space therebeneath extending the transverse expanse of a plurality of rows; a plurality of transversely spaced fore-and-aft extending ground-engaging row planter units having forward ends pivotally connected to the lower portion of the central section to permit the respective row units to float vertically in the open space beneath the rear section in accordance with the ground characteristics; rock arm means supported for vertical movement on the central section and extending forwardly therefrom; transversely spaced wheels supported on the rock arm means in the spacing between the forward and central sections whereby adjustment of the rock arm means may be utilized to raise and lower the frame means; and forward, central, and rear tanks supported on the frame structure adjacent the forward, central and rear sections respectively, said tanks extending across a transverse expanse of a plurality of planter units and the spacings therebetween and having means associated therewith for dispensing material adjacent the paths of movement of the respective row units.

7. A row-crop seed planter comprising: a forwardly movable rigid main frame structure having a central transverse horizontal section, a forward transverse horizontal section, and a rear section cantilevered rearwardly from the central section to define an unobstructed open space therebeneath extending the transverse expanse of a plurality of rows; a plurality of transversely spaced fore-and-aft extending ground-engaging row planter units on each side of the fore-and-aft center of the main frame structure and having forward ends pivotally connected to the central section to permit the respective row units to float vertically in the open space beneath the rear section in accordance with the ground characteristics; transversely alined and fore-and-aft spaced pairs of forward, central and rear tanks supported on the frame structure adjacent the forward, central and rear sections respectively, the respective pairs of said tanks having inner adjacent ends spaced transversely apart at the aforesaid center with each unit of said pairs extending across a transverse expanse of a plurality of planter units and the spacings therebetween and having associated therewith means for dispensing material adjacent the paths of movement of the respective row units; and transverse and fore-and-aft extending walkways supported on the frame extending between the tanks along the center of the main frame and in the fore-and-aft spacings between the tanks.

8. A tractor-drawn, row-crop seed planter comprising: a forwardly movable rigid main frame structure having a rigid transverse section and a rigid draft device rigid with and extending forwardly therefrom with a forward end adapted for connecting to a tractor, said frame structure including a frame extension cantilevered rearwardly from the transverse section to define an unobstructed open space therebeneath extending the transverse expanse of a plurality of rows; a plurality of transversely spaced fore-and-aft extending ground-engaging row planter units having forward ends pivotally connected to the transverse section to permit the respective row units to float vertically in the open space beneath the frame extension in accordance with the ground characteristics, and each of said row units having an individual seed hopper associated therewith; vertically adjustable rock arm means supported for vertical movement on the transverse section and extending forwardly therefrom; transversely spaced wheels supported on the rock arm means forwardly of the transverse section whereby adjustment of the rock arm means may be utilized to raise and lower the frame structure; a transversely elongated seed tank supported on the frame structure forwardly of and above the row units and extending across a transverse expanse of a plurality of planter units and the spacings therebetween and having associated therewith seed transferring tubes, one each for each row unit extending from transversely spaced entries into the tank downwardly and rearwardly into the respective hoppers of said units; a transverse walkway supported on said extension rearwardly of the tank; and a rear transverse tank containing material for ground-treating supported on the extension rearwardly of the walkway extending across a transverse expanse of row units with means for dispensing the material adjacent the paths of movement of the respective row units.

9. An agricultural machine for planting rows of crops comprising: a plurality of planting units of the type having individual seed hoppers and means for selecting individual seed from an accumulation of seed within the respective hoppers, a frame having transversely extending frame means to which said planting units may be adjustably secured for various row widths, said planter units being mounted for independent vertical movement, transversely elongated seed hoppers, each of which extends over a plurality of rows, carried by said frame independently of said planting units with each being capable of supplying additional seed to the individual hoppers of each of two or more planter units, and ground-engaging wheel means mounted on the frame means for relative vertical movement with respect to the frame, a rearwardly extending frame means carried by said first-mentioned transversely extending frame means, said rearwardly extending frame means carrying transversely elongated pesticide distributor containers, each extending over a plurality of said planting units and having conduit means extending towards each of said planter units beneath the respective container, and a catwalk means mounted on said rearwardly extending frame means and disposed between said pesticide distributor containers and said transversely elongated seed hoppers whereby the seed hopper means and the pesticide distributing means can be loaded with greater facility.

10. A row-crop seed planter comprising: a rigid forwardly movable main frame structure having a central transverse horizontal section with upper and lower portions, a forward transverse horizontal section spaced forwardly of the central section, and a rear section cantilevered rearwardly from the upper portion to define an unobstructed open space therebeneath extending the transverse expanse of a plurality of rows; a plurality of transversely spaced fore-and-aft extending ground-engaging row planter units having forward ends pivotally connected to the lower portion of the central section to permit the respective row units to float vertically in the open space beneath the rear section in accordance with the ground characteristics; vertically adjustable transversely spaced wheels supported on the frame structure in the spacing between the forward and central sections for raising and lowering the frame means; tanks supported on the frame structure in spaced fore-and-aft relation at the central and rear sections respectively with means associated therewith for dispensing material along the paths of movement of the row units, said tanks having a transverse expanse sufficient to extend across adjacent row units and the spacings therebetween; and an operator-supporting platform being supported on said rear section betwixt the central and rear tanks.

11. A row crop seed planter comprising: a rigid forwardly movable main frame structure having a central transverse horizontal section with upper and lower portions, a forward transverse horizontal section spaced forwardly of the central section, and a rear section cantilevered rearwardly from the upper portion to define an unobstructed open space therebeneath extending the transverse expanse of a plurality of rows; a plurality of transversely spaced fore-and-aft extending ground-engaging row planter units having forward ends pivotally connected to the lower portion of the central section to permit the respective row units to float vertically in the open space beneath the rear section in accordance with the ground characteristics; vertically adjustable transversely spaced wheels supported on the frame structure in the spacing between the forward and central sections for raising and lowering the frame means; tanks supported on the frame structure in spaced fore-and-aft relation at the central and rear sections respectively with means associated therewith for dispensing material along the paths of movement of the row units, said tanks having a transverse expanse sufficient to extend across adjacent row units and the spacings therebetween; and being alined transversely on opposite sides of a fore-and-aft centerline of the frame, said transversely alined tanks having their adjacent inner ends spaced apart transversely; and a fore-and-aft extending operator-supporting platform supported on the framework betwixt said ends of the tanks.

12. The structure as set forth in claim 10 in which the row units have a seed dispensing means with individual hoppers overhead of the seed dispensing means, the tanks supported on the central section are seed tanks and forwardly of the hoppers, and the means associated therewith for dispensing material includes flexible conduits between the tanks and the respective hoppers that extend forwardly and upwardly from the hoppers to the tanks.

UNITED STATES PATENT OFFICE
CERTIFICATE OF CORRECTION

Patent No. 3,543,704          Dated   1 December 1970

Inventor(s) Harold V. Hansen and Robert L. Chidester

It is certified that error appears in the above-identified patent and that said Letters Patent are hereby corrected as shown below:

Column 8, line 40, after "tanks" insert -- above --.

Signed and sealed this 18th day of May 1971.

(SEAL)
Attest:

EDWARD M. FLETCHER, JR.  
Attesting Officer

WILLIAM E. SCHUYLER, J  
Commissioner of Patent